April 8, 1969    W. C. DEE    3,437,387
FLUID BEARINGS
Filed May 3, 1967

INVENTOR:
WILLIAM C. DEE

United States Patent Office 3,437,387
Patented Apr. 8, 1969

3,437,387
FLUID BEARINGS
William Colin Dee, Bournemouth, England, assignor to Gilbert C. Davis, Forest Town, Johannesburg, Transvaal, Republic of South Africa
Filed May 3, 1967, Ser. No. 635,741
Claims priority, application Great Britain, May 6, 1966, 20,102/66
Int. Cl. F16c *1/24, 33/66, 13/02*
U.S. Cl. 308—122                                5 Claims

ABSTRACT OF THE DISCLOSURE

A fluid bearing has inner and outer relatively rotatable members. A bearing gap is defined between a cylindrical outer bearing surface of the inner member, and a cylindrical inner bearing surface of the outer member. Fluid under pressure is fed to the bearing gap through a series of slots disposed in the outer member at angular intervals about the axis. The inner end opening of each slot extends axially along the bearing surface, and the slots are arranged with their longitudinal median plane forming a tangent to a circle coaxial with the bearing surface so as to feed the fluid into the bearing gap with an angular flow component. In use, the inner member is rotated in a direction counter to that angular gas flow.

---

This invention relates to bearings of the kind in which two relatively movable members are supported and maintained spaced one with respect to the other by the feeding to the gap between them of a fluid under pressure, the fluid being allowed to exhaust or "bleed" from the bearing, e.g. to atmosphere. Such bearings, conventionally termed "hydrostatic or aerostatic bearings," have a major characteristic of being substantially frictionless, the only drag being that exerted on the fluid film in the gap by the moving member.

The term "fluid" is intended to refer both to gas fed bearings and liquid fed bearings.

In a conventional form of hydrostatic journal bearing fluid under pressure is fed to a gap between a shaft and a shell through radial holes in one of the members, at one or more positions along the axis. When the shaft is stationary relative to the shell the direction of the flow of the fluid from the feed holes to atmosphere is determined by the geometry and eccentricity, and the major component of flow is in the axial direction. The pressure distribution associated with this flow pattern provides the hydrostatic component of load capacity. However, when the shaft rotates relative to the shell the fluid drag exerted by the moving member on the fluid produces a circumferential component of fluid velocity which distorts the flow pattern. At low speeds the rotation of the shaft may contribute a "hydrodynamic" component to the bearing-load-supporting capacity, due to the pressure distribution produced by the wedge shaped clearance of the eccentrically disposed shaft when viewed along the axis. At high speeds however the circumferential velocity leads to instability which limits the speed range of operation.

Such bearings are commonly intended to operate from very low to very high speeds, for example of the order of some hundreds of thousands of revolutions per minute, and at such speeds the drag effect tends to become very pronounced and to give rise to a phenomenon well known in the art as "half-speed whirl." This results from circulation of the fluid film circumferentially at about half of the speed of rotation of the moving member, and effectively destroys the lifting force of the wedge-shaped fluid film which occurs in practice in the gap when the bearing members are in relative movement. This destruction of the hydrodynamic lifting force itself gives rise to inherent dynamic unbalance forces acting on the rotor and these can cause violent vibrations. An effect in practice is that when a high speed bearing, for example, of a gas-driven turbine, is run up through its range of speed, there is an intermediate speed range at which serious vibration sets in. This may occur even when the hydrostatic component of lifting force is large in relation to the hydrodynamic component.

Attempts have been made hitherto to reduce the deleterious effects of this vibration, e.g. the mounting of the outer bearing member in a resilient material of carefully selected hardness. However, whilst this is to some extent effective, it serves only to reduce the consequences of the "half-speed whirl" rather than to prevent it occurring.

Attempts have been made to control the circumferential component of fluid velocity by providing physical barriers to such movement, e.g. projections or depressions on the wall of the outer bearing member, or by lobing of the rotating member. However, the desirably extremely small clearances involved in fluid bearings preclude the provision of any effective physical barriers in any commercially practicable bearing.

It is accordingly the object of the present invention to provide a means of inhibiting, or at least very materially reducing, the circumferential component of movement of the fluid film whilst preserving both a very narrow gap between the bearing members and wholly smooth and truly circular surfaces for both bearing members. The aim of the invention is to prevent the instability associated with circumferential flow while retaining the hydrostatic load carrying capacity of the bearing.

According to the present invention in a fluid bearing comprising two relatively rotatable members defining a circumferential gap between them such that said members may be supported and maintained in spaced relationship one with respect to the other by feeding to said gap a fluid under pressure which is subsequently exhausted from said gap, fluid under pressure is introduced into said gap in such a manner as to tend to restrain tendency of the fluid within the gap to rotate with one of the rotatable members. The resulting back pressure restrains the film of fluid from circulating in the gap and thus causes the fluid to assume a more nearly wholly axial flow along the bearing gap.

Such feed of fluid to the gap may take place at a plurality of angularly spaced zones of the gap, with the purpose of causing the creation of a number of areas wherein the film is restricted in its tendency to move circumferentially, whereby the moving member may then become supported by a corresponding number of fluid pads within the gap.

The damming fluid supply may be introduced simultaneously at axially spaced positions of the bearing gap, and in a preferred form the introduction is made along a continuous axial length, e.g. through an elongated opening which has an axial component of direction.

It has been found in practice that the effect of introduction of the damming fluid supply may be enhanced if the damming fluid stream, at its point of entry into the bearing gap, is caused to travel with at least some component of direction circumferentially in the direction opposite to the direction of rotation of the moving member, that is to say contrary to the direction which the fluid film also tends to take up. Such an introduction may conveniently be effected by making the entry port for the fluid tangentially inclined with respect to the bore.

In a preferred form, means for feeding in said fluid to restrain rotation are passage means formed on one of the rotatable members and opening into the gap such that the fluid enters the gap approximately tangentially and counter to the direction of rotation of the other rotatable member.

In one convenient form of fluid bearing, the bearing fluid supply is fed to the bearing gap through a series of radial slots in the outer bearing member, the radial slots being arranged at equal spacing about the circumference of two or more circles spaced axially of the bearing. In such an arrangement, a suitable form of entry port for the damming fluid supply would be, for instance, an elongated slot of a length slightly less than the axial spacing of two adjacent rows of radial slots, said damming feed slot being parallel to the axis and disposed (considered in the axial direction) symmetrically between the circles on which the radial feed slots are pitched. The damming feed slot is made tangentially inclined to the bearing gap and is directed such that the entry of the damming gas supply is contrary to the direction of rotation of the inner bearing member. A number of such damming feed slots may be positioned about the circumference of the bearing, e.g. one such slot for each adjacent pair of radial feed slots. It will be appreciated that each such slot acts to provide a damming effect somewhat downstream (circumferentially) of the pair of radial feed slots which supply the associated bearing fluid feed. The result is that the bearing fluid issuing from the radial feed slots tends to take a more nearly truly axial direction towards its point of exhausting from the bearing gap, and at the same time maintaining a stabilized pressure pad within the central reservation bounded by the axial and radial slits. The circumferential movement of the bearing fluid feed is restricted to the area of the "pad" thus formed, i.e. at the most to that arc of the circumference of the bearing gap defined between the associated radial feed slots and the axial slots.

The result of inhibiting the circumferential flow of the bearing fluid film is to eliminate the tendency to half-speed whirl, and/or to push the speed at which half-speed whirl will occur to such a high figure as to be near to or even greater than the maximum possible speed of rotation, i.e. bursting point of the rotating components, whereby the bearing may then be used over the whole of its normal useful range without exhibiting half-speed whirl at any point during run-up. Both load carrying capacity and bearing stiffness are increased by the order of upwards of 50%.

Alternatively the bearing may so be used without the addition of the radial slots such that three or more axial slots only are incorporated within the bearing shell, thereby again maintaining a more truly axial flow condition within the bearing clearance.

It will be appreciated that the axial tangentially-inclined fluid feed slots will impart a rotational drive to the shaft member when no power to drive the rotating component in opposition to the axial feed is applied and therefore some form of brake or stop is required when no drive is taking place.

The general construction and operation of the radial/axial slotted fluid bearing may be as generally set out in detail in United Kingdom Patent No. 1,099,560 dated June 18, 1965, but it must be borne in mind that said patent refers to low length-to-diameter ratios of one and under, whereas this application relates to high length to diameter ratios of the order of 2 and over.

In a convenient method of obtaining the axial openings, the outer rotatable member is a sleeve which is cut longitudinally in a plane at least approximately tangential to its bore, a face produced by said cut being cut back along a part of the length of the member so as to produce a tangentially directed fluid feed slot. For example, the sleeve may be cut at three planes at 120° angular separation, and the three sleeve elements thus formed may be locked in assembly by end members.

In a convenient method of obtaining radial openings, one of the rotatable members has two elements each with a radial face butted against the radial face of the other.

The or each radial opening is formed by cutting back axially the radial face of one element so as to result in the defining of a slot when the elements are re-assembled face to face.

In order that the nature of the invention may be readily ascertained, two embodiments of gas bearing in accordance therewith are hereinafter particularly described with reference to the figures of the accompanying drawings, wherein.

Figure 1:
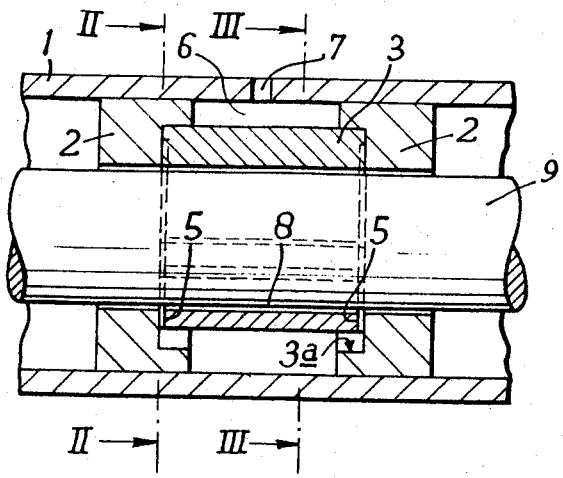
FIG. 1 is an axial section through a first embodiment of gas bearing having both radial and axial slots.
Figure 2:
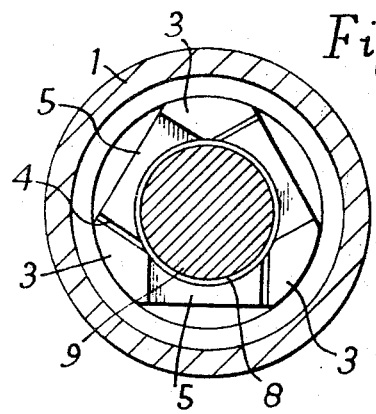
FIG. 2 is a radial section taken on the line II—II thereof.
Figure 3:
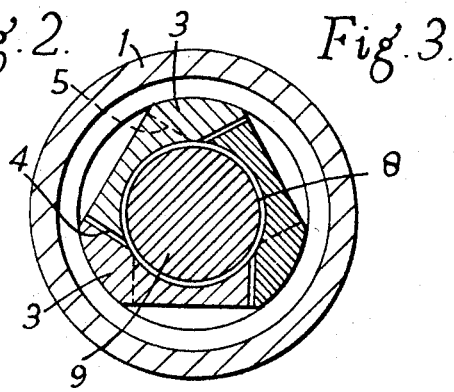
FIG. 3 is a radial section taken on the line III—III thereof.

Referring to the embodiment shown in FIGS. 1 to 3, the journal bearing is composed of five main components supported within a cylindrical bore in any suitable mounting member 1. In said bore are disposed two axially spaced annular end members 2 having between them a generally cylindrical bearing outer member 3. The member 3 is split into three segments by cutting it from end to end in planes which are tangential to its inner circumference, as best seen from FIG. 3. One of the faces formed, by this cutting, on each of the three segments is then machined so as to cut back that face along all of its length with the exception of a short land at each end. When the three segments are subsequently re-assembled they define between each adjacent pair a tangential slot 4.

Each end face of each segment is also milled across radially so as to cut back the end face in the axial direction, but the width of the cut is less than the circumferential dimension of the segment, so that a land is left at each side of the cut. When the respective segments are butted up against the end members 2, there is defined between the end member 2 and each segment a radial slot 5. To permit feed of fluid to the outer end of the radial slots 5, the external circumference of the outer member 3, which is generally an exact fit within an inner diameter of the end member 2, is cut away along three chordal planes so that the gas may flow to the slots 5 from the annular feed chamber 6 receiving pressurized gas through a feed opening 7.

The gas fed is through the three radial slots 5, at each end of the member 3, to the bearing gap 8 defined between the member 3 and the journal rotor shaft 9. Gas is also fed to the same gap 8 through the three axial slots 4, and in a direction which is counter to the direction of rotation of the shaft 9, as indicated by the arrow in FIG. 2. The result is to form, in the gap 8, three bearing "pads" of gas which do not tend to rotate with the journal shaft 9.

Figure 5:
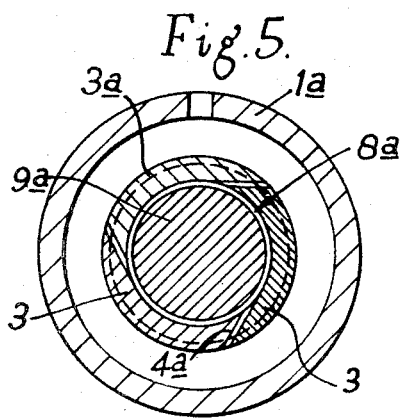
FIG. 5 is a radial section taken on the line V—V of FIG. 4.
Figure 4:
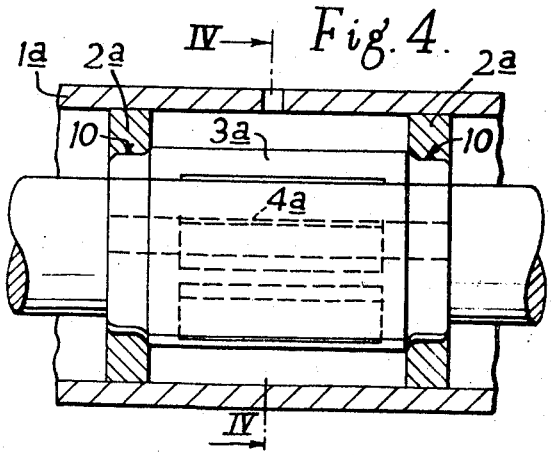
FIG. 4 is an axial section through a second embodiment of gas bearing having only axial slots.

Referring now to FIGS. 4 and 5, there is shown an embodiment which has three axial slots but no radial slots. In this construction, a mounting member 1a has within it two axially spaced annular end members 2a which are simple annular collars. A bearing outer member 3a is composed of three sections which are formed by splitting a cylindrical shell by cuts made in planes which are tangential to its inner circumference. One of the faces formed, by this cutting, on each of the three segments is then machined so as to cut back the face along all of its length with the exception of a short land at each end, whereby when the segments are re-assembled they define between each adjacent pair a tangential slot 4a. At each end, the external diameter of the member 3a is reduced to form a neck 10 and each such neck is formed into the bore of the adjacent end member 2a which thus locks the assembly firmly together. In this construction the gas supply to the bearing gap 8a is obtained solely through the three axial slots 4a, which direct the inflowing gas counter to the direction of rotation of the shaft 9a, as indicated by the arrow in FIG. 5. The gas in the bearing gap accordingly tends to form into three pads which do not rotate with the shaft 9a.

In both of the embodiments described above, the journal shaft 8 or 8a tends at all times to be supported by two of the gas pads, according to the direction of radial load imposed, even if such load is constituted only by the weight of the shaft itself.

I claim:

1. A fluid bearing comprising a first relatively rotatable member having a body-of-revolution outer peripheral surface to serve as one boundary of a fluid bearing gap, a second relatively rotatable member having a body-of-revolution internal peripheral surface disposed about and spaced radially from said outer peripheral surface of said first member to serve as the other boundary of said fluid bearing gap, said second member including fluid supply chamber means spaced radially externally from said internal peripheral surface, said second member including a plurality of fluid supply passages each of which opens at one of its ends at the internal peripheral surface and each of which passages opens at its other end into said fluid supply chamber means, each such fluid supply passage being in the form of a slot having a thickness dimension which is relatively small compared with its width dimension, the slot being positioned such that the thickness dimension is disposed angularly of said internal peripheral surface of the second member and such that the width dimension is disposed axially along said surface, said slot being positioned such that its median longitudinal plane constitutes a tangent to a body-of-revolution coaxial with said internal peripheral surface, whereby fluid flowing under pressure from said fluid supply chamber means passes through said plurality of slots to emerge uniformly along the entire width of the respective openings thereof into the bearing gap with an angular component of direction about the axis of the internal peripheral surface of the first member, the slots all being positioned such that the fluid emerging from them has an angular component in the same direction about said axis.

2. A fluid bearing, as claimed in claim 1, wherein said second relatively rotatable member includes a housing, a sleeve mounted within said housing and having its bore constituting the internal peripheral surface, the fluid supply chamber means being defined between said sleeve and said housing, said sleeve being constituted by a plurality of separate segments bounded by faces lying longitudinal cutting planes which are each a tangent to a body-of-revolution coaxial with the internal peripheral surface, one of each pair of abutting adjacent faces of neighbouring sleeve sections being recessed angularly parallel to the respective cutting plane, thereby to define a respective one of said slots between each neighbouring pair of sleeve sections, the angular extent of the recessing being the thickness dimension of the slots, the axial extent of the recessing being the width dimension of the slot, and the extent of the recessing parallel to the cutting plane being the length of the slot and being such that the slot opens at one end at the internal peripheral surface and at the other end into the fluid supply chamber means.

3. A fluid bearing, as claimed in claim 2, wherein the housing has a bore and a pair of axially spaced end members coaxially mounted therein, each end member having a coaxial recess, and wherein said sleeve is engaged at its ends into the recesses of the end members and the outer periphery of the sleeve defines, with the bore of the housing and with the end members an annular fluid supply chamber common to all of the slots.

4. A fluid bearing, as claimed in claim 2, wherein the housing has a bore and a pair of axially spaced end members coaxially mounted therein, each end member having a coaxial recess terminated by a radial face abutted by a radial end face of the sleeve, each segment of the sleeve being cut away externally along a respective chordal plane so as to define with the end wall a fluid feed passage communicating with the fluid supply chamber means, the radial end faces of the sleeve being recessed in the axial direction on each segment so as to define with the end wall a radial slot, each said radial slot opening at its inner end into the fluid bearing gap and at its outer end into the respective fluid feed passage.

5. A fluid bearing, as claimed in claim 1, having three slots arranged at 120° angular spacing about the axis of the internal peripheral surface.

References Cited

UNITED STATES PATENTS

| 2,683,635 | 7/1954 | Wilcox | 308—9 |
| 2,851,879 | 9/1958 | Wetherbee et al. | 308—122 X |
| 3,132,903 | 5/1964 | Webb | 308—9 |

FOREIGN PATENTS

| 72,352 | 11/1943 | Poland. |
| 1,001,335 | 8/1965 | Great Britain. |

CARROLL B. DORITY, JR., *Primary Examiner.*

U.S. Cl. X.R.

308—9